(12) United States Patent
Sukekawa et al.

(10) Patent No.: US 6,940,640 B2
(45) Date of Patent: Sep. 6, 2005

(54) INVERTED MICROSCOPE

(75) Inventors: Minoru Sukekawa, Hachioji (JP);
Susumu Honda, Hachioji (JP);
Atsuhiro Tsuchiya, Hachioji (JP);
Miwa Kojima, Chigasaki (JP); Keisuke Tamura, Hamburg (DE)

(73) Assignee: Olympus Optical Co., Ltd., Tokyo (JP)

( * ) Notice: Subject to any disclaimer, the term of this patent is extended or adjusted under 35 U.S.C. 154(b) by 135 days.

(21) Appl. No.: 10/365,965

(22) Filed: Feb. 13, 2003

(65) Prior Publication Data

US 2003/0165010 A1 Sep. 4, 2003

(30) Foreign Application Priority Data

Feb. 15, 2002 (JP) .................................... 2002-039135

(51) Int. Cl.⁷ .............................................. G02B 21/00
(52) U.S. Cl. .................................... 359/368; 359/381
(58) Field of Search ............................. 359/368, 369, 359/381, 385, 390, 391, 819, 821

(56) References Cited

U.S. PATENT DOCUMENTS 5,535,052 A * 7/1996 Jorgens ..................... 359/388
5,850,038 A * 12/1998 Ue ............................. 73/105

FOREIGN PATENT DOCUMENTS

| JP | 5-123993 | 5/1993 |
| JP | 6-342121 | 12/1994 |
| JP | 11-6964 | 4/1996 |
| JP | 08-094940 | 4/1996 |
| JP | 2001-66516 | 3/2001 |

OTHER PUBLICATIONS

"PMG3/PME3 Series, Inverted Microscope", published by Olympus Optical Co., Ltd. (1995, Tokyo, Japan) p. 1–2.

* cited by examiner

*Primary Examiner*—Mark A. Robinson
(74) *Attorney, Agent, or Firm*—Frishauf, Holtz, Goodman & Chick, P.C.

(57) ABSTRACT

The inverted microscope comprises a microscope main body, a stage configured to place a specimen thereon, a stage fixing part arranged between the stage and the microscope main body and configured to fix the stage to the microscope main body, an objective lens configured to observe the specimen from below the stage, an observation optical system configured to observe a specimen image taken by the objective lens with an eyepiece, and a reflection member configured to reflect an image in vicinity of the objective lens from vicinity of the eyepiece, the reflection member being arranged below the stage fixing part of the microscope main body and arranged on an axis which is almost parallel to an optical axis of the observation optical system passing the eyepiece and passes vicinity of the eyepiece.

14 Claims, 9 Drawing Sheets

INVERTED MICROSCOPE

CROSS-REFERENCE TO RELATED APPLICATIONS

This application is based upon and claims the benefit of priority from the prior Japanese Patent Application No. 2002-039135, filed Feb. 15, 2002, the entire contents of which are incorporated herein by reference.

BACKGROUND OF THE INVENTION

1. Field of the Invention

The present invention relates to an inverted microscope, which magnifies and observes a specimen placed on a stage from below the stage with an objective lens.

2. Description of the Background Art

An inverted microscope used for observing a specimen placed on a stage from below is known. In general, the inverted microscope has a stage, objective lenses, a revolver, various types of optical devices, an optical system switching unit, and the like. The stage is fixed to the microscope main body, and the specimen is placed thereon. The objective lenses are located below the stage and used to magnify and observe the specimen. The revolver selectively inserts the objective lenses in the optical path. The various types of optical devices selectively deflect the wavelengths of illumination light from a light source to the specimen. The optical system switching unit switches optical systems by selectively inserting and removing the optical devices in and from the optical path. The objective lenses, revolver, and optical system switching unit can be operated in various manners, e.g., switching, from outside the microscope main body. To perform these operations, an opening is formed in the stage fixing part of the microscope main body.

Generally, an optical path for microscopic observation is formed on the front surface of the microscope main body. Accordingly, the opening for allowing operation of the objective lenses, revolver, and optical system switching unit is provided on the left or right side surface with respect to the front surface of the microscope main body.

In some inverted microscope used for metal observation which uses such an opening, a pivotally held mirror is arranged on the deep side of the side surface of the microscope main body. This improves the visibility of the objective lens (e.g., Jpn. Pat. Appln. KOKAI Publication Nos. 6-342121 and 5-123993).

Other microscopes in addition to the microscope, which arranges the mirror at the opening on the side surface of the microscope main body to visually recognize the objective lens, are also proposed. For example, an opening for visually recognizing objective lenses is formed in a stage. A light-transmitting member made of glass, a resin, or the like is formed in the opening. The objective lenses can be checked through the light-transmitting member (Jpn. Pat. Appln. KOKAI Publication No. 2001-66516). Alternatively, the periphery of a light-transmitting hole in the central seat of the stage is formed of a meshed member. The objective lenses can be checked through the meshed member (Jpn. Pat. Appln. KOKAI Publication No. 11-6964).

BRIEF SUMMARY OF THE INVENTION

The inverted microscope according to the first aspect of the present invention, comprising: a microscope main body; a stage configured to place a specimen thereon; a stage fixing part arranged between the stage and the microscope main body and configured to fix the stage to the microscope main body; an objective lens configured to observe the specimen from below the stage; an observation optical system configured to observe a specimen image taken by the objective lens with an eyepiece; and a reflection member configured to reflect an image in vicinity of the objective lens from vicinity of the eyepiece, the reflection member being arranged below the stage fixing part of the microscope main body and arranged on an axis which is almost parallel to an optical axis of the observation optical system passing the eyepiece and passes vicinity of the eyepiece.

The inverted microscope according to the second aspect of the present invention, comprising: a microscope main body; a stage configured to place a specimen thereon; a stage fixing part arranged between the stage and the microscope main body and configured to fix the stage to the microscope main body; an objective lens configured to observe the specimen from below the stage; an observation optical system configured to observe a specimen image taken by the objective lens with an eyepiece; and a reflection mechanism having a reflection member and a holding part to hold the reflection member at a predetermined angle and configured to reflect an image in vicinity of the objective lens from vicinity of the eyepiece, the reflection member being arranged below the stage fixing part of the microscope main body and arranged on an axis which is almost parallel to an optical axis of the observation optical system passing the eyepiece and passes vicinity of the eyepiece.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be described with reference to the accompanying drawings.

(First Embodiment)

Figure 1:
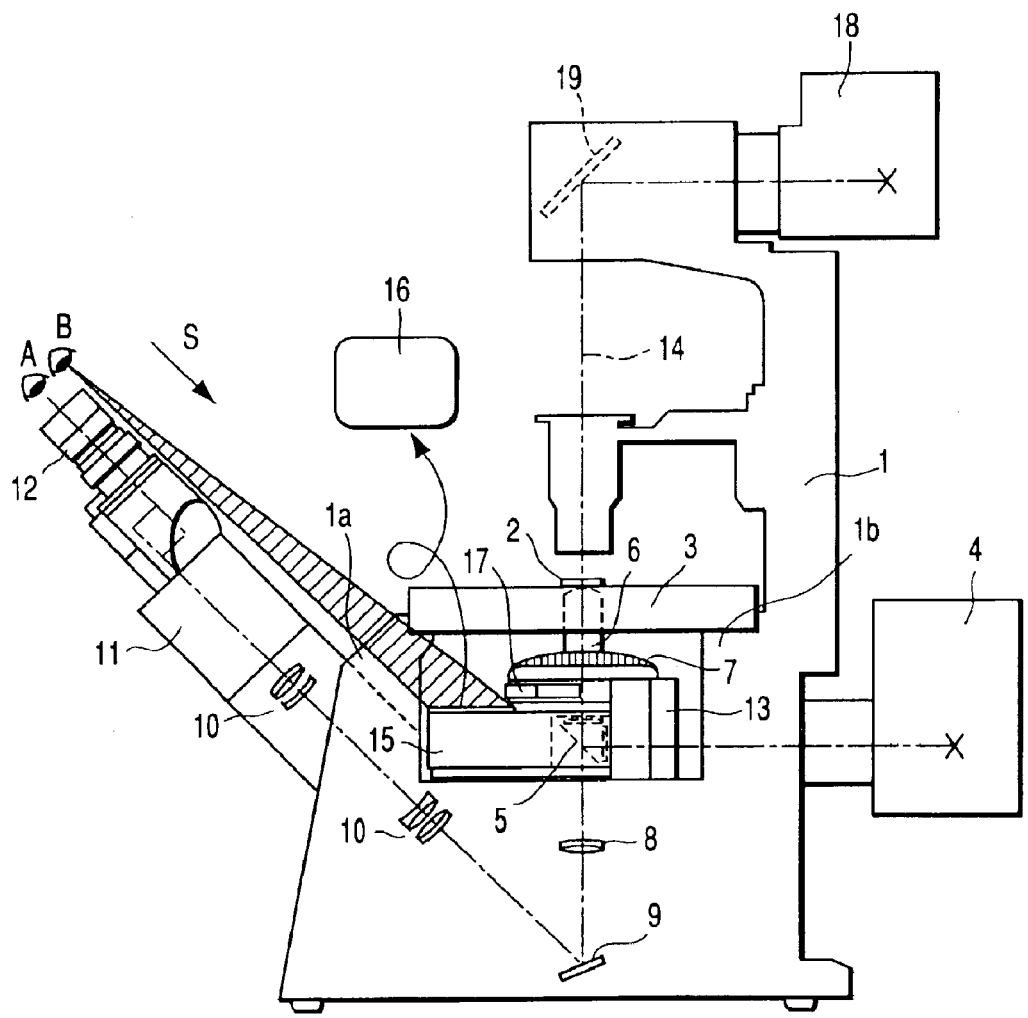
FIG. 1 is a view showing the schematic arrangement of an inverted microscope according to the first embodiment.

FIG. 1 shows the schematic arrangement of an inverted microscope according to the first embodiment.

Referring to FIG. 1, a microscope main body 1 has a front fixing part 1a and a rear fixing part 1b for fixing a stage. A stage 3 is arranged on the front fixing part 1a and rear fixing part 1b across them. A specimen 2 is placed on the stage 3.

An incident illumination source 4 has a halogen lamp and/or a mercury lamp. A beam from the incident illumination source 4 is guided to the microscope main body 1, is reflected by a dichroic mirror 5, and irradiates the specimen 2 through one objective lens 6. In this case, a plurality of objective lenses 6 are held by a revolver 7. When the revolver 7 rotates, one objective lens 6 is selectively arranged on an optical axis 14.

Luminescence image from the specimen 2 is magnified by the objective lens 6, and is transmitted through the dichroic mirror 5. The magnified image of the specimen 2 is formed by a tube lens 8, and is reflected by a reflection mirror 9 obliquely upward (at an angle of 45° with respect to the horizontal direction). The image of the specimen 2 is relayed by a relay optical system 10, becomes incident on an eyepiece 12 attached to an observation lens tube 11, and reaches the eye of the observer. Thus, the observer can observe the magnified image of the specimen 2.

This will be described in detail. The revolver 7 which holds the plurality of objective lenses 6 is held by the microscope main body 1 through a holding part 13. The revolver 7 can vertically move along the optical axis 14 by operating a focusing handle (not shown). This changes the distance between the specimen 2 on the stage 3 and the objective lens 6 relative to each other, so that the specimen 2 can be focused. An optical device switching unit 15 is provided between the revolver 7 below the objective lenses 6 and the reflection mirror 9. The optical device switching unit 15 has, in addition to the dichroic mirror 5, a plurality of optical devices (not shown). The optical device switching unit 15 selectively arranges the optical devices such as the dichroic mirror 5 at the intersection of the optical axis 14 of the observation optical axis and the optical path from the incident illumination source 4. A sheet-like reflection member 16 is arranged on the upper surface of the optical device switching unit 15. With the reflection member 16, the reflected image of that objective lens 6, among the plurality of objective lenses 6 held by the revolver 7, which is arranged on the optical axis 14 can be observed in the vicinity of the eyepiece 12. The sheet-like reflection member 16 may be one obtained by forming a reflection member on a flat rubber, plastic, or metal member by adhesion or vapor deposition. In this specification, the "observation optical system" refers only to that optical system in which the beam is reflected by mainly the reflection member 16 and reaches the eyepiece 12.

An optical device 17 such as a polarization plate or Nomarski prism is arranged between the revolver 7 and optical device switching unit 15. The optical device 17 corresponds to various types of microscopic inspection and can be selectively inserted in and removed from the optical axis 14.

In FIG. 1, a transmission illumination source 18 is a light source to irradiate the specimen 2 with a transmission illumination on. A beam from the transmission illumination source 18 is reflected by a reflection mirror 19 and irradiates the specimen 2 along the optical axis 14.

Figures 2A, 2B:
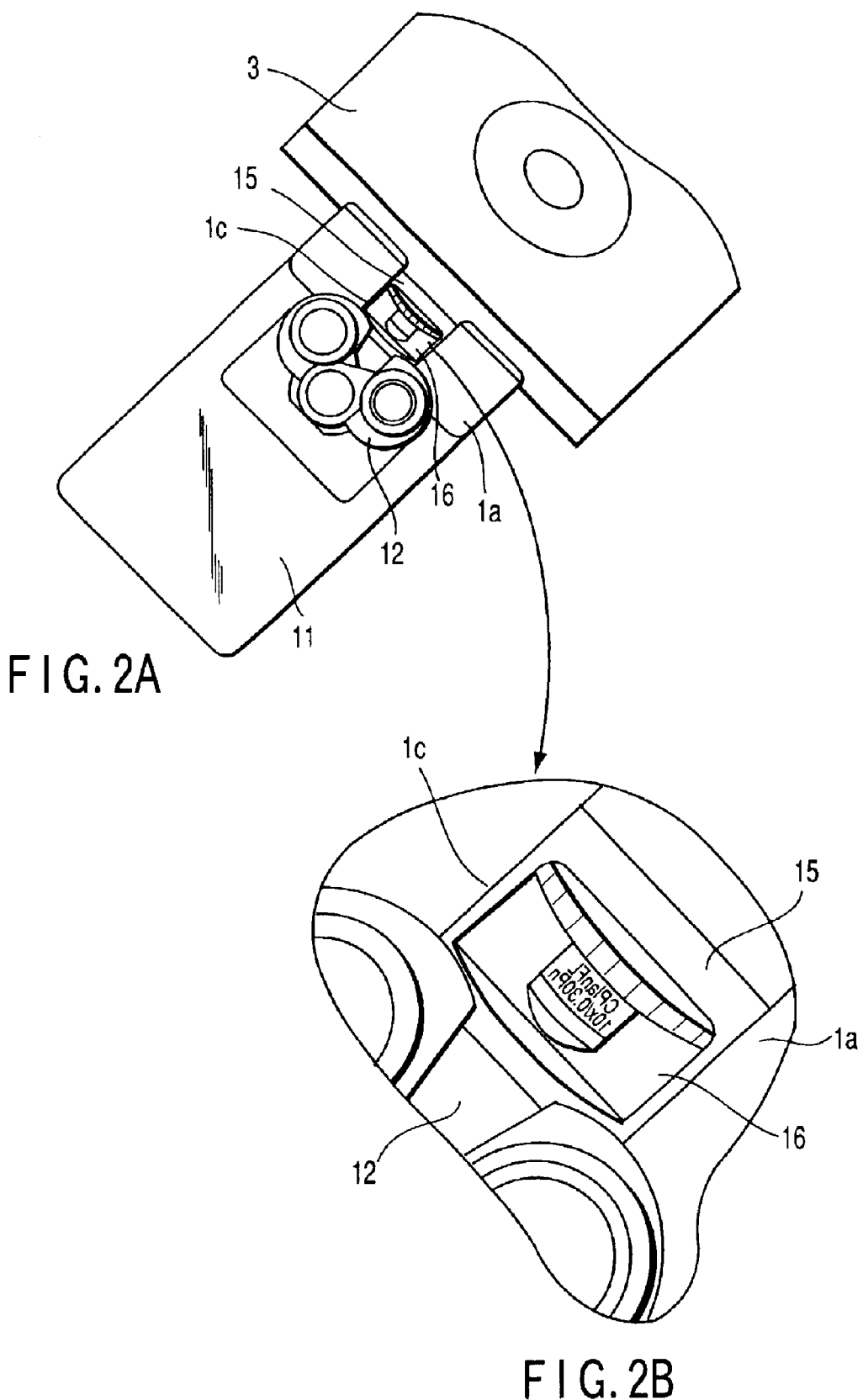
FIGS. 2A and 2B are enlarged views of the main part of FIG. 1.

FIG. 2A is the view of the microscope main body 1 of FIG. 1 seen from the direction of an arrow S. FIG. 2B is the enlarged view of a part near an opening 1c of FIG. 2A. As shown in FIGS. 2A and 2B, the microscope main body 1 has the opening 1c at the center of its front fixing part 1a. With the opening 1c, the sheet-like reflection member 16 formed on the optical device switching unit 15 in the microscope main body 1 can be seen from outside the microscope main body 1. More specifically, when the observer who observes the specimen 2 with the eyepiece 12 turns his or her eyes away from the eyepiece 12 and raises his eyes slightly above it, he can see the image of the objective lens 6 reflected by the reflection member 16 through the opening 1c.

Figure 3:
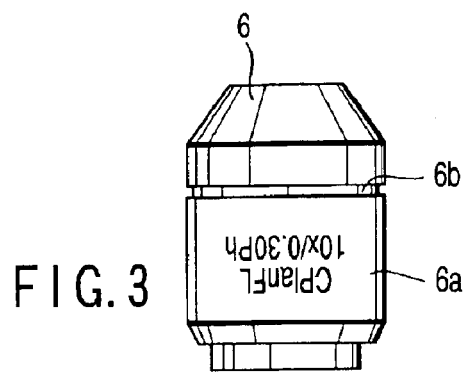
FIG. 3 is a view for explaining an objective lens used in the inverted microscope.

The objective lens 6 will be described. As shown in FIG. 3, a display 6a indicating the type, magnification, and the like of the objective lens is formed on the outer surface of the objective lens 6. More specifically, for example, "CPlanFL" indicates the type of the objective lens. "10×" indicates the magnification of the objective lens. "0.03Ph" indicates that that the lens has NA of 0.30, and "Ph" indicates that the lens is for phase difference observation. Other than "Ph", symbols "Oil", "W", and "RC" can be used. The symbol "Oil" indicates that the lens is an objective lens for oil. The symbol "W" indicates that the lens is an objective lens for immersion. The symbol "RC" indicates that the lens is a relief contrast lens. The display 6a can be identified by changing the character color in accordance with the matching observation scheme. A color band 6b is formed above the display 6a. The color of the color band 6b may be changed in accordance with the magnification to facilitate identification.

When ordinary microscopic observation is to be performed, the observer performs microscopic observation at an eye position A shown in FIG. 1 through the eyepiece 12.

In this state, when the observer wishes to switch the objective lens 6 in the optical path in accordance with change of the observation conditions, he moves his eye position to a position B. At the position B, the observer checks the display 6a and color band 6b of the objective lenses 6 reflected by the reflection member 16 on the optical device switching unit 15 through the opening 1c of the front fixing part 1a of the microscope main body 1.

The observer checks the objective lens 6 located on the optical axis 14 from the content of the display 6a and the color of the color band 6b. The observer continues rotating the revolver 7 until he can check the content of the display 6a and the color of the color band 6b corresponding to a desired objective lens 6 through the opening 1c.

When the observer can check the content of the display 6a and the color of the color band 6b of the display 6a corresponding to the desired objective lens 6 through the opening 1c, he ends rotating the revolver 7. Then, an objective lens 6 optimal for the new observation conditions can be switched in the optical path. When the observer returns his eye position to the position A, he can perform ordinary microscopic observation through the eyepiece 12.

The content of the display 6a of the objective lens 6 which is seen through the opening 1c is the image reflected by the reflection member 16, as shown in FIG. 2B. This does not pose any problem in practice. This is because the matching observation scheme can be identified from the color of the display 6a and the magnification can be identified from the color of the color band 6b.

Therefore, the observer can check the type and the like of the objective lens 6 inserted in the optical path by only slightly moving his eye position during microscopic observation from the position A to the position B. Hence, upon change of the observation conditions, the objective lens 6 can be switched quickly and correctly.

With the inverted microscope according to the first embodiment, the content of the display 6a and the color of the color band 6b corresponding to the objective lens 6 are checked through the opening 1c. Because of this simple arrangement, this inverted microscope is inexpensive.

The stage 3 where the specimen 2 is to be placed need not use a light-transmitting member or meshed member for observation. Thus, a conventional stage made of a metal material such as aluminum, which has high rigidity and is not damaged easily, can be used. Even when some device hits or rubs the stage surface during manipulating the specimen, the stage surface will not be damaged, and the specimen supporting precision will not be decreased. As a result, a high reliability can be maintained.

Also, change of the central seat in accordance with the application, e.g., change to a heat plate, which cannot be performed in a conventional microscope using a glass central seat can be performed without impairing the visibility of the objective lens.

Figure 4:
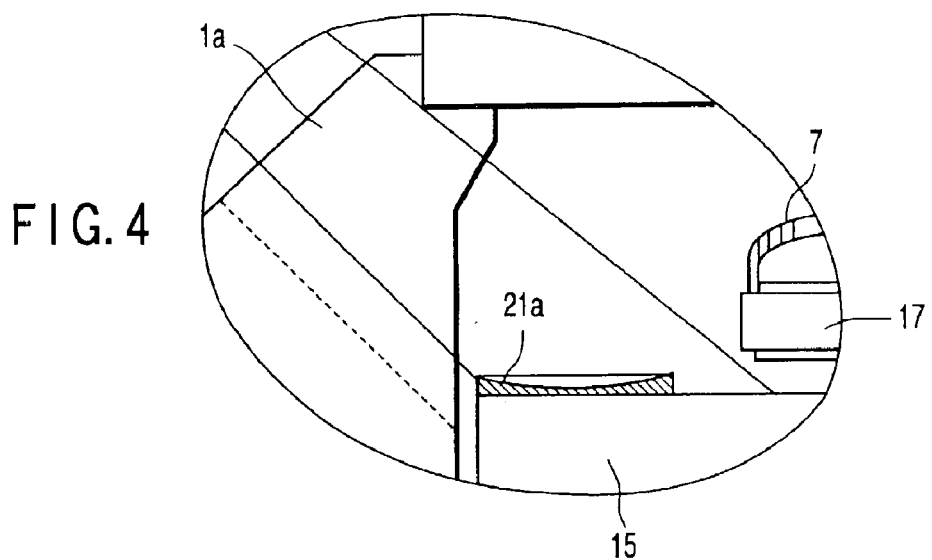
FIG. 4 is a view showing the schematic arrangement of the main part of the first modification of the first embodiment.

In the first embodiment described above, the sheet-like reflection member 16 is formed on the optical device switching unit 15. In place of the sheet-like reflection member 16, for example, a concave mirror 21a as a reflection member with a concave surface may be formed, as shown in FIG. 4. In FIG. 4, the same parts as in FIG. 1 are denoted by the same reference numerals. With the concave mirror 21a, the magnified images of the display 6a and color band 6b of the objective lens 6 can be seen through the opening 1c.

Figure 5:
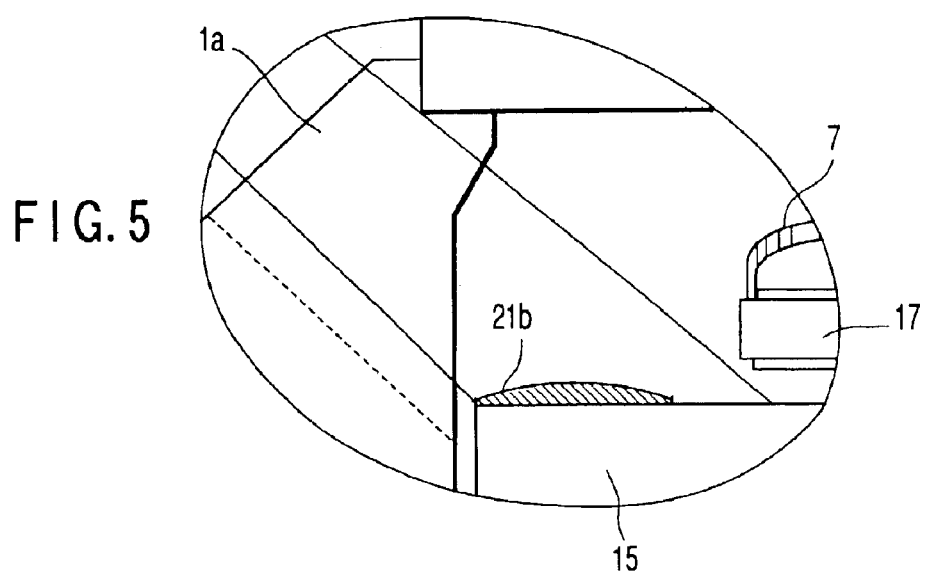
FIG. 5 is a view showing the schematic arrangement of the main part of the second modification of the first embodiment.

As shown in FIG. 5, a convex mirror 21b as a reflection member with a convex surface may be used. In FIG. 5, the same parts as in FIG. 1 are denoted by the same reference numerals. With the convex mirror 21b, a region over a wide range can be checked. The objective lens 6 can be checked through the opening 1c. Moreover, whether the optical device 17 such as a polarization plate or Nomarski prism, which corresponds to various types of microscopic inspection and is arranged below the revolver 7, is inserted in or removed from the optical path can be checked through the opening 1c.

Figure 6:
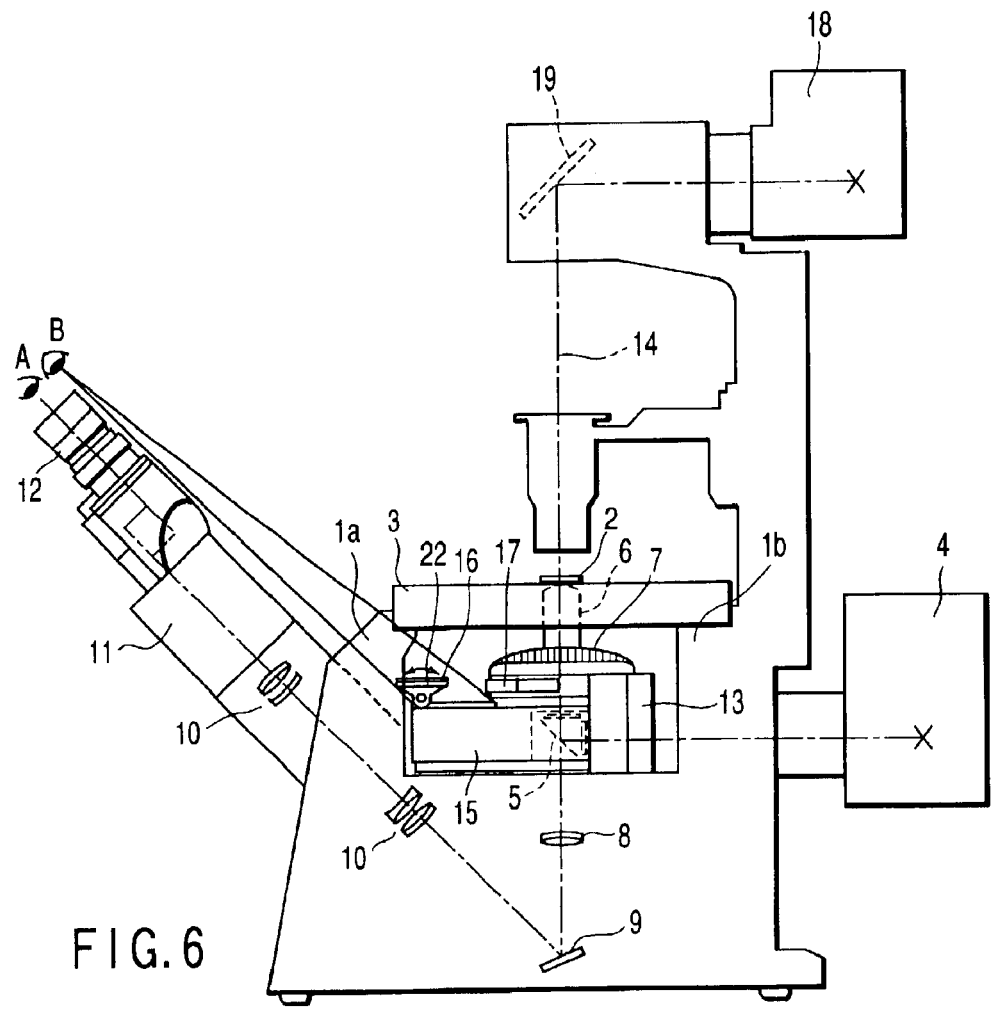
FIG. 6 is a view showing the schematic arrangement of the third modification of the first embodiment.

As shown in FIG. 6, a holding member 22 pivotal in the directions of the arrows may be provided on the optical device switching unit 15. The seat-like reflection member 16 may be formed on the holding member 22. In FIG. 6, the same parts as in FIG. 1 are denoted by the same reference numerals. When the holding member 22 is pivoted, the position of the reflection member 16 is finely adjusted. Hence, the display 6a and color band 6b of the objective lens 6 can be seen more easily through the opening 1c. In addition, whether the optical device 17 to be arranged below the revolver 7 is inserted in or removed from the optical path can be selectively checked over a wide range. The pivotal holding member 22 can be naturally combined with the concave mirror 21a or convex mirror 21b described with reference to FIG. 4 or 5. Alternatively, the holding member 22 may be omitted, and the reflection member 16 may be pivotal.

The reflection member 16 may be fixed on the optical device switching unit 15 with an adhesive tape or the like. Then, when the surface of the reflection member 16 is badly damaged, the reflection member 16 can be changed easily. Although not shown, assume a case wherein incident illumination observation is not employed and no optical device switching unit 15 is arranged. In this case, the reflection member 16 may be fixed to a fixing member that replaces the optical device switching unit 15, and be arranged at a predetermined position.

(Second Embodiment)

Figure 7:
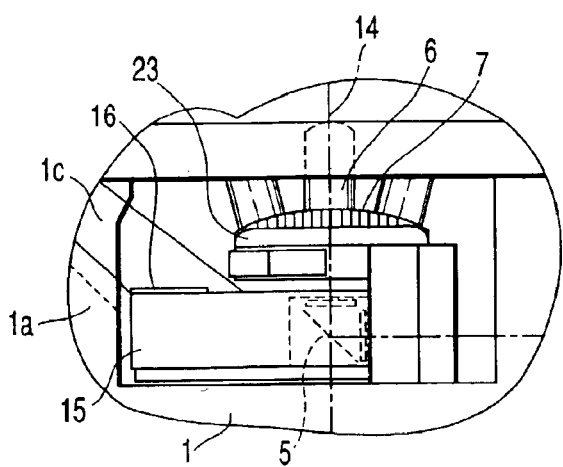
FIG. 7 is a view showing the schematic arrangement of the main part of an inverted microscope according to the second embodiment.
Figure 8:
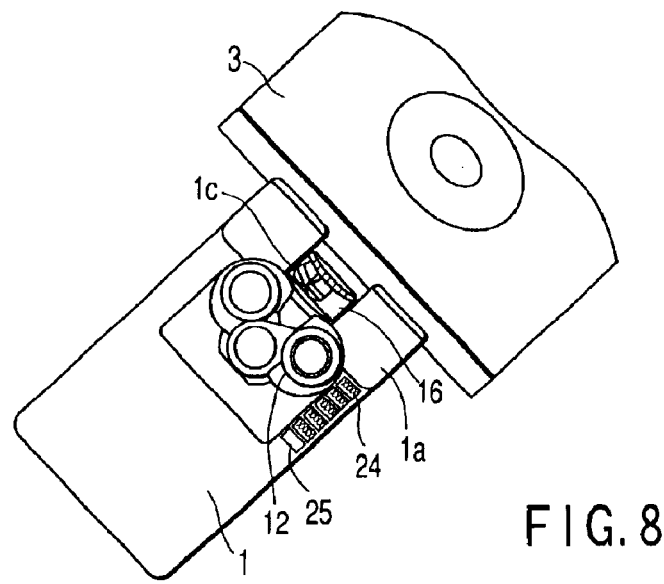
FIG. 8 is a view showing the schematic arrangement of the main part of the second embodiment.

FIGS. 7 and 8 are views showing the schematic arrangement of the main part of the second embodiment of the present invention. In FIGS. 7 and 8, the same parts as in FIG. 1 are denoted by the same reference numerals, and a detailed description thereof will be omitted.

In the second embodiment, as shown in FIG. 7, a display 23 is formed in the vicinity of objective lenses 6, in this case, on the outer edge of a revolver 7 which holds the objective lenses 6. The display 23 indicates figures corresponding to the objective lenses 6 and the like. The position and the like of the display 23 are adjusted such that a figure corresponding to an objective lens 6 inserted in an optical axis 14 can be checked through an opening 1c after it is reflected by a reflection member 16.

In the second embodiment, as shown in FIG. 8, a plurality of display plates 24 are provided in the vicinity of an eyepiece 12 of a microscope main body 1 or observation lens tube 11. The display plates 24 have notes describing the types, magnifications, and matching observation schemes of the objective lenses 6 corresponding to the figures of the display 23. The display plates 24 are housed in detachable pockets 25 respectively.

With this arrangement, upon change of the observation conditions, if the observer wishes to switch the objective lens 6 in the optical path, he checks the figure of the display 23 on the revolver 7 reflected by the reflection member 16 of an optical device switching unit 15 through the opening 1c.

Subsequently, the observer rotates the revolver 7 while checking the objective lens 6, positioned on the optical axis 14, from the figure seen through the opening 1c. The observer continues rotating the revolver 7 until the figure of a desired objective lens 6 is observed through the opening 1c. In this case, if the display plates 24 in the vicinity of the eyepiece 12 of the microscope main body 1 are also utilized, the observer can easily check the objective lens 6 positioned on the optical axis 14. Each display plate 24 shows the type, magnification, and matching observation scheme of the objective lens 6. The observer can thus determine at a glance how much the revolver 7 needs to be rotated to position the desired objective lens 6 on the optical axis 14.

When the figure corresponding to the desired objective lens 6 can be checked through the opening 1c, the observer ends rotating the revolver 7. Hence, an optimal objective lens 6 can be switched in the optical path in accordance with the observation conditions.

In this manner, what kind of objective lens 6 is set on the revolver 7 can be known at a glance. In addition, how much the revolver 7 must be rotated to position a next desired objective lens 6 on the optical axis 14 can also be checked easily. Therefore, switching of the objective lens 6 and the like can be performed quickly.

If the figures on the display 23 on the outer edge of the revolver 7 and the display contents of the display plates 24 are indicated using a light-storing coating, the objective lens 6 can be easily checked even during observation in a dark room.

(Third Embodiment)

Figure 9:
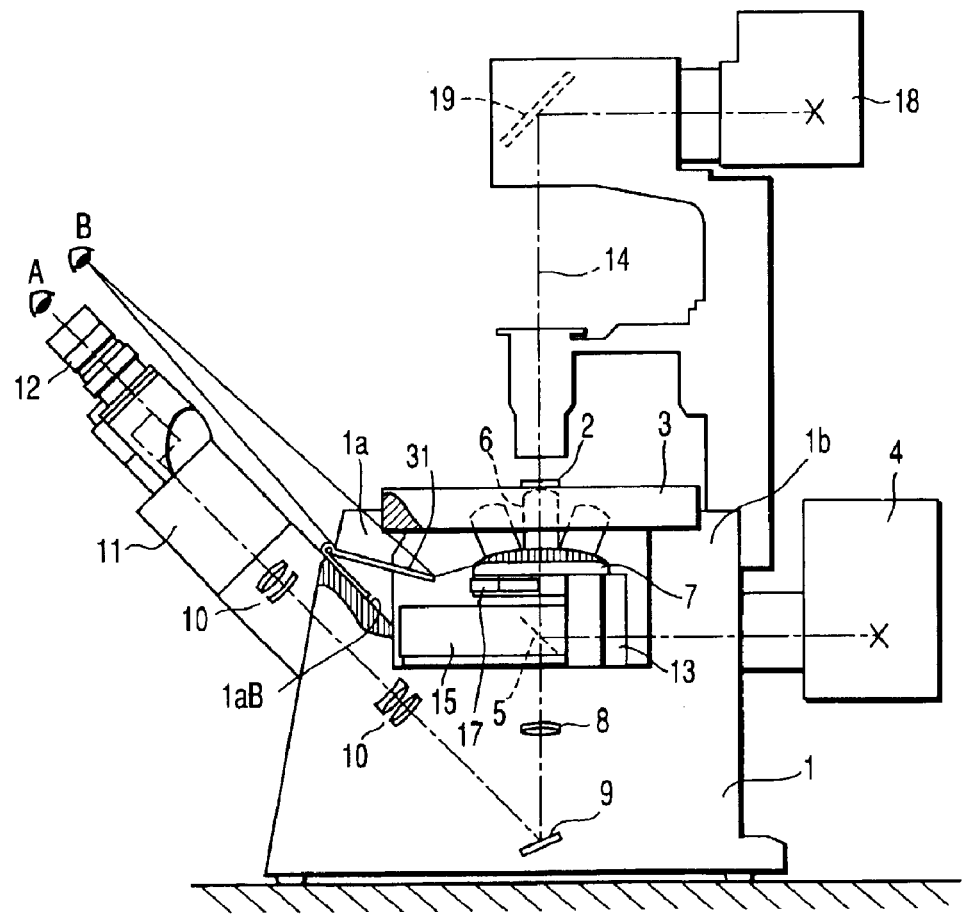
FIG. 9 is a view showing the schematic arrangement of an inverted microscope according to the third embodiment.

FIG. 9 is a view showing the schematic arrangement of the third embodiment of the present invention. In FIG. 9, the same parts as in FIG. 1 are denoted by the same reference numerals, and a detailed description thereof will be omitted.

Figure 10:
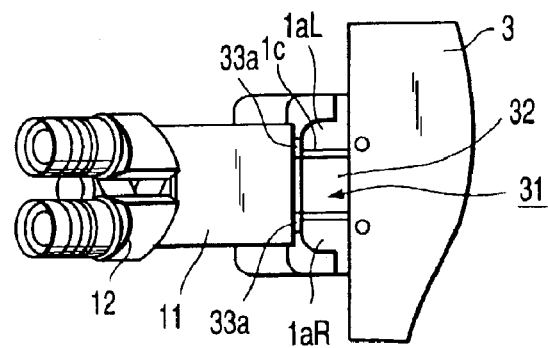
FIG. 10 is an enlarged view of the main part of FIG. 9.

In the third embodiment, a microscope main body 1 has an opening 1c at the center of its front fixing part 1a, in the same manner as in the first embodiment. As shown in FIG. 10, the opening 1c is formed of a space surrounded by a right fixing part 1aR, left fixing part 1aL, bottom fixing part 1aB, and stage 3. The right fixing part 1aR and left fixing part 1aL form the front fixing part 1a. The bottom fixing part 1aB has a surface inclining at 45° with respect to the horizontal direction. A reflection mirror unit 31 is formed as a reflection mechanism in the opening 1c.

Figure 11:
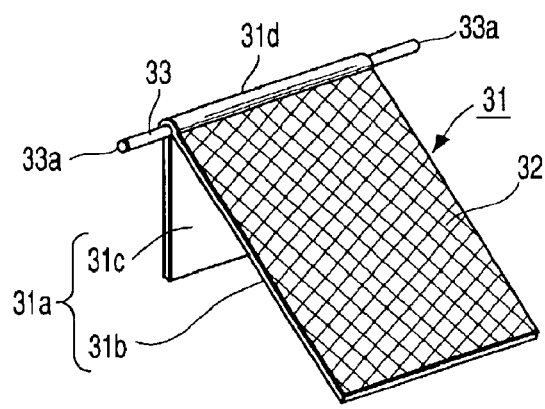
FIG. 11 is a view showing the schematic arrangement of a reflection mirror unit used in the third embodiment.

FIG. 11 is a view showing the schematic arrangement of the reflection mirror unit 31.

In FIG. 11, a plate-like member 31a has first and second surfaces 31b and 31c bent at an angle of almost 30°. A reflection member 32 is formed on the first surface 31b. The reflection member 32 is fixed to the first surface 31b by adhesion or any other method. Alternatively, the first surface 31b may have a reflecting function.

A cylindrical part 31d is formed along the widthwise direction of the plate-like member 31a at that side surface of the plate-like member 31a which forms a predetermined angle, i.e., at the bent part of the plate-like member 31a. A shaft 33 as the pivot center of the reflection member 32 is inserted in the cylindrical part 31d. The length of the shaft 33 is larger than the width of the plate-like member 31a. The two ends of the shaft 33 form projections 33a projecting from the two sides of the plate-like member 31a for predetermined amounts.

Figure 12:
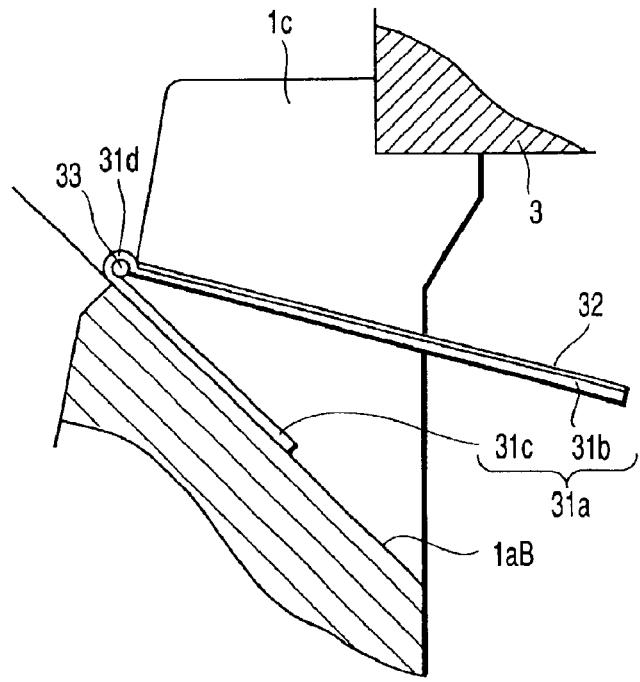
FIG. 12 is a view showing how the reflection mirror unit used in the third embodiment is attached.

The reflection mirror unit 31 as described above is positioned as shown in FIG. 10. Namely, the projections 33a of the shaft 33 are clamped between an observation lens tube 11 and the proximal ends of the right and left fixing parts 1aR and 1aL of the opening 1c. The second surface 31c of the plate-like member 31a of the reflection mirror unit 31 is attached to the bottom fixing part 1aB by its own weight, as shown in FIG. 12. Thus, the reflection mirror unit 31 is attached to the opening 1c of the microscope main body 1. In this state, the image of an objective lens 6 held by the revolver 7, which is reflected by the reflection member 32 of the reflection mirror unit 31, can be checked through the opening 1c.

With the above arrangement, the observer performs ordinary microscopic observation at an eye position A shown in FIG. 9 through an eyepiece 12, as described above.

Upon change of the observation conditions, if the observer wishes to switch the objective lens 6 in the optical path, he moves his eye position to a position B. The observer then checks the image of the objective lens 6, which is reflected by the reflection member 32 of the reflection mirror unit 31, through the opening 1c of the front fixing part 1a of the microscope main body 1.

Therefore, in the third embodiment as well, the observer can check the type and the like of the objective lens 6 inserted in the optical path through the reflection member 32 on the reflection mirror unit 31 by only slightly moving his eye position during microscopic observation from the position A to the position B. As a result, switching of the objective lens 6 upon change of observation conditions can be performed quickly and correctly.

The reflection mirror unit 31 is attached to the opening 1c of the front fixing part 1a as it is merely placed there, without using any adhesive or the like at all. Therefore, the reflection mirror unit 31 can be attached and removed by holding it with fingers. If the reflection member 32 is soiled, the reflection member 32 can be removed easily, and be cleaned or replaced.

In the third embodiment as well, no light-transmitting member, mesh-like member, or the like need be provided to a stage 3 where a specimen 2 is to be placed. Even when some device hits or rubs the surface of the light-transmitting member during manipulating the specimen, the stage will not be damaged, and the specimen supporting precision will not be decreased. As a result, an arrangement with high reliability can be maintained.

Figure 13:
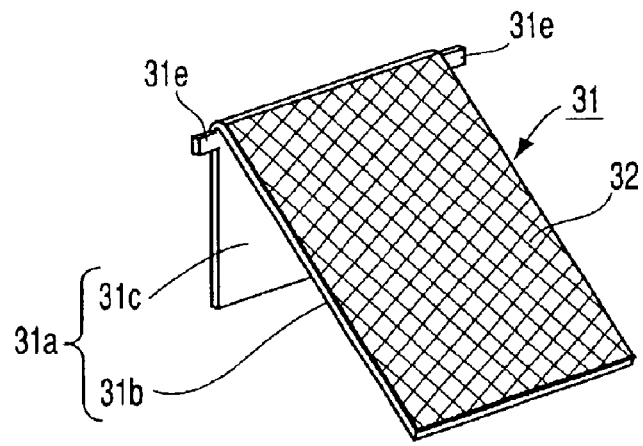
FIG. 13 is a view showing the schematic arrangement of the reflection mirror unit according to the first modification used in the third embodiment.

In the reflection mirror unit 31 according to the third embodiment, the shaft 33 is inserted along the bent part of the two-fold plate-like member 31a. However, the present invention is not limited to this. For example, in pace of the shaft 33, as shown in FIG. 13, projections 31e may be formed on the two sides of one of the surface of the first surface 31b or the second surface 31c of the two-fold plate-like member 31a. The reflection mirror unit 31 may be attached to the opening 1c of the microscope main body 1 by using the projections 31e. In this manner as well, the same effect as that of the third embodiment can be expected.

Figure 14:
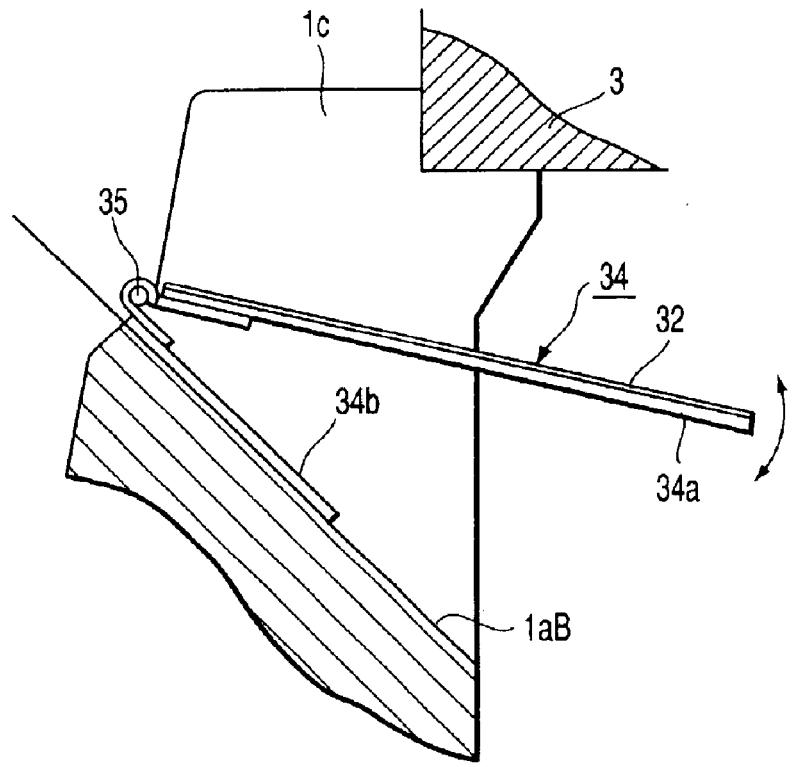
FIG. 14 is a view showing the schematic arrangement of the reflection mirror unit according to the second modification used in the third embodiment.

In the reflection mirror unit 31 according to the third embodiment, the angle formed by the first surface 31b and second surface 31c of the plate-like member 31a is constant. However, this angle can be adjusted. For example, in this case, as shown in FIG. 14, a reflection mirror unit 34 has a plate-like member 34a and plate-like member 34b. The reflection member 32 is adhered to the plate-like member 34a. The plate-like member 34b has projections (not shown) similar to the projections 31e shown in FIG. 13. The plate-like member 34a and plate-like member 34b are connected to each other through a hinge 35. The angle formed by the plate-like members 34a and 34b can be arbitrarily set by moving the plate-like member 34a in the directions of arrows. In this case, the hinge 35 preferably has a large slide resistance during pivot operation. Then, the angle formed by the plate-like members 34a and 34b can be held.

With the reflection mirror unit 34 as described above, the angle formed by the plate-like members 34a and 34b can be adjusted. After the reflection mirror unit 34 is attached to the opening 1c of the microscope main body 1, the observer can optimally adjust the direction of the reflection member 32 such that the objective lens 6 can be checked through the opening 1c. A specific example is as follows. The angle formed by the plate-like members 34a and 34b, that is, the angle of inclination of the reflection member 32 may be adjusted within the range of, e.g., 20° to 25°. Then, whether an optical device 17 such as a polarization plate or Nomarski prism, which corresponds to various types of microscopic inspection and is arranged below the revolver 7, is inserted in or removed from the optical path can be checked through the opening 1c.

Figure 15:
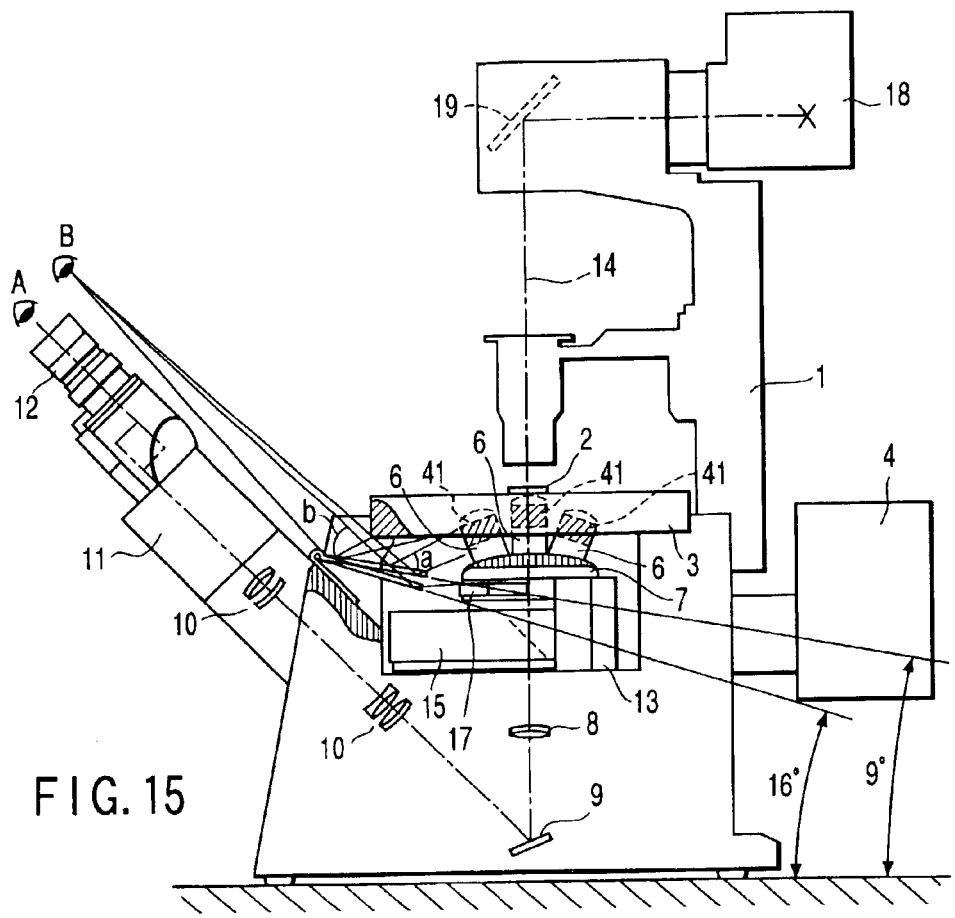
FIG. 15 is a view for explaining how to set the range of the angle of inclination of a reflection member for the reflection mirror unit.

FIG. 15 is a view for explaining how to set the range of the angle of inclination of the reflection member 32 for the reflection mirror unit 34. As shown in FIG. 15, assume that the plate-like member 34a adhered with the reflection member 32 is held within the range of 9° to 16° with respect to the horizontal plane. Then, the objective lens 6 can be checked through the opening 1c. For this purpose, the angle formed by the plate-like members 34a and 34b may be set at any value within the range of 27° to 35°. It is confirmed that when the angle formed by the plate-like members 34a and 34b is 30°, the range of the objective lens 6 that can be visually checked through the opening 1c is the widest.

From the foregoing, in the reflection mirror unit 31 as shown in FIGS. 11 and 13, the angle of which is fixed by bending, the bending angle is preferably set to 30°. In the reflection mirror unit 34 described with reference to FIG. 15, the angle formed by the plate-like members 34a and 32b can be adjusted. The angle between the plate-like members 34a and 34b is preferably changed between 27° and 35°, and set. Then, the observer can see the objective lens 6 easily.

In FIG. 15, in a case of adjusting the angle between the plate-like members 34a and 34b, when the eyes are set at the position B, it is preferable to adjust such that the angle, of which the image in vicinity of the objective lens 6 is incident to the plate-like member 34a, becomes equal to the angle between the line of sight and the plate-like member 34a. If the angle between the plate-like members 34a and 43b are fixed, the angle between the plate-like members 34a and 43b are set beforehand such that the angle between the line of sight and the plate-like member 34a becomes the incident angle b when the eyes are raised to the position B. Then, eyes are almost set to the position B.

In the third embodiment, the objective lens 6 refers to an objective lens 6 which has a color band for identifying the magnification which is usually used. However, the present invention is not limited to this. For example, an objective lens 6 on which a color rubber band 41 is mounted as shown in FIG. 15 can be used. In this case, the color rubber band 41 is detachable. Also, the color rubber band 41 has a band width larger than that of a conventional color line indicating the magnification of the objective lens 6. The colors of the color rubber bands 41 differ for different magnifications. A specific magnification is determined in accordance with the magnification.

In this manner, the color rubber band 41 may be mounted on each objective lens 6. Then, when the objective lens 6 is seen through the opening 1c, the color rubber band 41 indicating the magnification can also be seen clearly. Hence, the magnification of the objective lens 6 can be recognized more correctly.

In the third embodiment, the reflection mirror unit 31 has two plate-like members. One plate-like member serves as a reflection member, and the other serves as a member for holding the angle of the reflection member. However, this embodiment is not limited to this, but can be modified in various manners.

Figure 16:
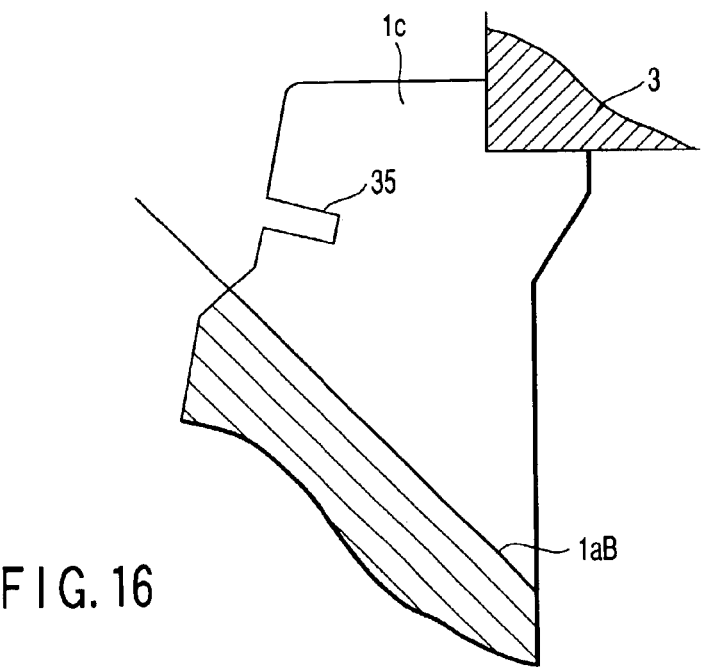
FIG. 16 is a view showing the first modification of the method of attaching the reflection member.
Figure 17:
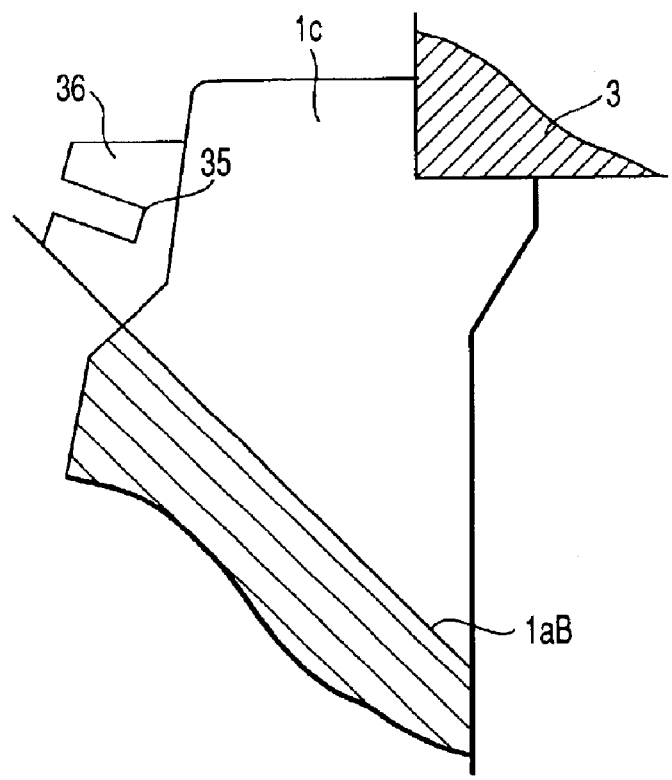
FIG. 17 is a view showing the second modification of the method of attaching the reflection member.

For example, as shown in FIG. 16, a groove 35 may be formed in the front fixing part. A projection may be fitted in the groove 35, so that the reflection member is fixed. With this arrangement, the angle of the reflection member is determined by the angle of the groove 35. The groove 35 need not be formed in the front fixing part. As shown in FIG. 17, a jig 36 for forming the groove 35 may be attached to the front fixing part (or the microscope main body or lens barrel), and a reflection member may be attached to the groove 35. When the projection is fitted in the groove 35, the angle of the reflection member is determined by the upper and lower surfaces of the groove 35. This makes the holding part unnecessary.

As the holding member, a plate-like member is abutted against the lower part of the front fixing part and is fixed. However, this structure is not always necessary. The holding member can have any structure as far as the angle of the reflection member can be set.

Figure 18:
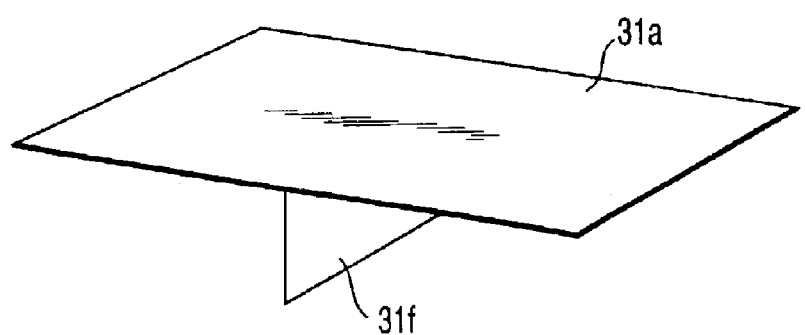
FIG. 18 is a view showing a modification of the reflection mirror unit.

For example, as shown in FIG. 18, a leg 31f may be formed on the lower surface of the plate-like member 31a, so that the plate-like member 31a can be set at any desired angle. The leg 31f can be a plate, or can be any other shape such as a rod. The leg 31f may be formed at the end or at a side part. More specifically, the leg 31f can have any arrangement as far as the plate-like member 31a can be fixed to the front fixing part and the angle of the plate-like member 31a can be set (or changed). Alternatively, the leg 31f may be obtained by merely fixing a plate-like member to a fixing part with, e.g., a screw.

The plate-like member 31a and leg 31f in FIG. 18 can be connected to each other by any method such as adhesion, welding, screw fixing, press fitting, and the like.

In addition, in the above-mentioned embodiment, the reflection mirror unit 31 is made as plate-like members. It is not limited to this. For example, the reflection mirror unit 31 is made as a block with triangular pillar and the reflection member 31a is mounted on one of the lateral faces thereof. Then, the angle of the reflection member 31a may be adjusted by adjusting the angle between the lateral faces of the triangular pillar. In this case, the reflection mirror unit 31 may be fixed such that the block-like reflection mirror unit 31 may be set on the microscope main body 1 and may be fixed to a groove provided to the microscope main body 1 or the corner of the microscope main body 1 (not shown in the figure) by providing a projection part to the block-like reflection mirror unit 31.

The present invention is not limited to the respective embodiments described above, but can be modified in various manners in practicing it without changing its spirit. For example, in the above description, the opening 1c is formed at the center of the front fixing part 1a of the microscope main body 1. The opening 1c can include one formed in the side edge of the front fixing part 1a like a notch. It suffices as far as the opening 1c is formed at such position that the image of the objective lens 6 reflected by the reflection member 16 can be seen through it. Alternatively, another reflection member may be arranged below the lower surface of the stage 3. An image reflected by this reflection member may be reflected by the reflection member 16. This image can be seen from outside the microscope main body 1 through the opening 1c. Various types of optical devices in the microscope main body 1 can thus be seen in a wider range.

The respective embodiments described above include inventions at various stages. Various types of inventions can be extracted from appropriate combinations of the plurality of constituent requirements that are disclosed. For example, assume that even if several ones of all the constituent requirements disclosed in the respective embodiments are deleted, the problems described in the column of the problems to be solved by the invention can be solved, and that the effect described in the column of the effect of the invention can be obtained. In this case, an arrangement from which these several constituent requirements are deleted can be extracted as an invention.

According to the embodiments of the present invention, the observer can check the type and the like of the objective lens inserted in the optical path by only slightly moving his eye position during microscopic observation. That is, the observer can check the optical device arranged on the optical path by hardly moving his body during observation. In addition, change of an objective lens upon change of the observation conditions can be performed quickly and accurately. Furthermore, the stage where the specimen is to be placed can be highly reliable one with high rigidity which is not damaged easily.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An inverted microscope comprising:
a microscope main body;
a stage which is adapted to support a specimen thereon;
a stage fixing part arranged between the stage and the microscope main body to fix the stage to the microscope main body;
an objective lens to observe the specimen from below the stage;
an optical system to transmit a specimen image from the objective lens to an eyepiece;
a reflection member to reflect an image from a vicinity of the objective lens to a vicinity of the eyepiece; and
an opening provided in a front of the fixing part on an eyepiece side of the microscope main body;
wherein an image of the objective lens reflected by the reflection member is observable through the opening.

2. The inverted microscope according to claim 1, further comprising an optical device switching unit arranged on an optical axis of the optical system;
wherein the reflection member is provided on a housing of the optical device switching unit.

3. The inverted microscope according to claim 1, wherein the reflection member comprises a planar reflection surface.

4. The inverted microscope according to claim 1, wherein the reflection member comprises one of a planar reflection surface, a concave reflection surface, and a convex reflection surface.

5. The inverted microscope according to claim 1 further comprising a pivotable holding member which holds the reflection member.

6. The inverted microscope according to claim 1, wherein the reflection member is pivotable.

7. The inverted microscope according to claim 1, wherein the objective lens includes a first display containing information corresponding to the objective lens; and wherein a second display is provided on the microscope main body to be visible from the vicinity of the eyepiece, said second display containing information corresponding to the information in the first display.

8. The inverted microscope according to claim 1, further comprising a holding part which holds the reflection member at an angle.

9. The inverted microscope according to claim 8, wherein the angle is adjustable.

10. The inverted microscope according to claim 8, wherein the angle is fixed.

11. The inverted microscope according to claim 8, further comprising projection parts projecting from respective sides of the reflection member;
wherein the fixing part comprises right and left fixing parts respectively provided at right and left sides of the opening, and each of the projection parts is clamped between an observation lens tube for the optical system and a proximal end of a corresponding one of the left and right fixing parts.

12. The inverted microscope according to claim 11, wherein the projection parts are integral with one of the holding part and the reflection member.

13. The inverted microscope according to claim 8, wherein each of the reflection member and the holding part comprises a respective plate member.

14. The inverted microscope according to claim 8, wherein each of the reflection member and the holding part comprises a respective portion of a bent plate member.

* * * * *